(12) United States Patent
Bullmann et al.

(10) Patent No.: US 7,086,686 B2
(45) Date of Patent: Aug. 8, 2006

(54) SIDE IMPACT BEAM

(75) Inventors: Detlef Bullmann, Paderborn (DE); Lars Ulrich, Pattensen (DE); Ralf König, Schlangen (DE); Alfons Fortstroer, Paderborn (DE); Ludger Gehringhoff, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 276 days.

(21) Appl. No.: 10/282,546

(22) Filed: Oct. 29, 2002

(65) Prior Publication Data
US 2003/0178273 A1   Sep. 25, 2003

(30) Foreign Application Priority Data
Mar. 22, 2002   (DE) ................ 102 12 792

(51) Int. Cl.
*B60J 5/00* (2006.01)
(52) U.S. Cl. ................ 296/146.6; 188/377
(58) Field of Classification Search ......... 296/146.6; 188/377
See application file for complete search history.

(56) References Cited

U.S. PATENT DOCUMENTS

| | | | | |
|---|---|---|---|---|
| 4,090,734 A | * | 5/1978 | Inami et al. | 296/146.6 |
| 5,370,437 A | * | 12/1994 | Alberda | 296/146.6 |
| 5,404,690 A | * | 4/1995 | Hanf | 52/735.1 |
| 5,580,120 A | * | 12/1996 | Nees et al. | 296/146.6 |
| 5,813,718 A | * | 9/1998 | Masuda et al. | 296/146.6 |
| 5,887,938 A | * | 3/1999 | Topker et al. | 296/187.12 |
| 6,454,884 B1 | * | 9/2002 | McNulty et al. | 148/520 |
| 6,482,496 B1 | * | 11/2002 | Wycech | 428/71 |
| 6,622,450 B1 | * | 9/2003 | Nees et al. | 52/735.1 |

FOREIGN PATENT DOCUMENTS

| | | |
|---|---|---|
| DE | 296 22 985 | 12/1996 |
| WO | WO 00/154553 | 3/2000 |

\* cited by examiner

*Primary Examiner*—Robert A. Siconolfi
(74) *Attorney, Agent, or Firm*—Henry M. Feiereisen; Ursula B. Day

(57) ABSTRACT

A side impact beam for incorporation into the structure of a motor vehicle comprises a sheet metal profile with flaring end portions and two longitudinal beads extending along the sheet metal profile and wherein the end portions that are provided with cross beads that are stamped in an additional tooling step during manufacturing and after the longitudinal beads have been formed, and are arranged in transverse disposition to the longitudinal beads and wherein the longitudinal beads and the cross beads are oriented in the same direction and the length of one cross bead corresponds approximately to the width of the two longitudinal beads, such that the so configured cross beads provide a stabilizing effect of the end portions and ensure the flattening of the connecting surfaces, thereby leading to a reduction of assembly problems.

4 Claims, 2 Drawing Sheets

SIDE IMPACT BEAM

CROSS-REFERENCES TO RELATED APPLICATIONS

This application claims the priority of German Patent Application Serial No. 102 12 792.1, filed Mar. 22, 2002 pursuant to 35 U.S.C. 119(a)–(d), the subject matter of which is incorporated herein by reference.

BACKGROUND OF THE INVENTION

The present invention relates to a side impact beam, and in particular to a side impact beam for incorporation into an automobile made from profiled metal.

From the prior art, for example DE 296 22 985 U1, a side impact beam is known which is configured with a straight end part and an upwardly bent terminal lug. The lug is forming a bracket and projects into one of the door columns of the car body when the door is closed. The bracket is designed to establish a second form-fit connection in addition to the door lock connection of the car door, in order to provide additional safety in the case of an accident when a side impact collision occurs.

Furthermore, the prior art as seen in WO 00/15453, includes a side impact beam with a profiled longitudinal beam having flaring end parts with a laterally straight configuration.

In order to realize a proper and time efficient assembly of side impact beams into the structure of a car body, the end portions of the beams which act as connecting points, have to be configured in an unvarying straight fashion. Thus, for purposes of serial production, the end portions are subject to a strict planar configuration for integration into the car structure.

However, within the frame work of production, problems can arise and in particular when the side impact beams are manufactured from cold-formed super high strength sheet metal. The high strength of the sheet metal material and the reshaping of the sheet metal material cause inner tensions in the material that are leading at the end portions of the beams to serious deviation in evenness. The longitudinal beams themselves or the ends of the beams may twist, arch or turn out wavy. These unwanted deformations lead to extensive problems during production assembly.

SUMMARY OF THE INVENTION

In view of the afore-described shortcomings, it would be desirable and advantageous to provide an improved side impact beam, which eliminates these drawbacks.

The present invention resolves prior art problems and the afore-described drawbacks by providing the side impact beams with evenly configured end portions that are fit for serial assembly and with which a high level of reproducibility can be realized, especially for industrial scale manufacturing.

In particular, according to one aspect of the present invention, a side impact beam for integration into a motor vehicle comprises a profiled sheet metal with at least one longitudinal bead and flaring end portions, wherein said sheet metal having at least one cross bead located on either end portion so that either cross bead is oriented transverse to said longitudinal bead. The profiled sheet metal can also be an open profiled sheet metal and the cross bead can be an open cross bead.

For stabilizing the end portions of the profile of the side impact beam, at least one cross bead is provided that extends transverse to the longitudinal bead of the side impact beam. With this additional cross bead at the end portion the desired evenness of the connection planes in the end portions are realized. For practical purposes during production, the cross beads can be introduced in a further production step after the formation of the longitudinal beads.

The dimensions of the cross beads with regard to their size and shape is adapted to the type of side impact beam manufactured and the respective assembly situation.

Thus, the side impact beam according to the present invention is represented by a profiled piece with optimized measurements. Assembly problems that are due to inaccuracies in the measurements of the connection planes are substantially reduced or even completely eliminated. Furthermore, a stiffening of the end portions supports the function of the side impact beam and improves performance during crash impact. Moreover, the production method is simple and the respective production costs are low.

Various advantageous features of the different embodiments represent the principles of the present invention.

In a preferred embodiment, the side impact beam has a cross bead of a length corresponding to the width of a longitudinal bead. In practice, a side impact beam with a configuration wherein two longitudinal beads are positioned next to each other is regarded as particularly efficient. One cross bead is placed on either end portion with the length of each cross bead corresponding to the width of both longitudinal beads.

Advantageously, the longitudinal beads and the cross beads are both stamped in the metal beam in the same orientation or plane, wherein the cross beads are positioned in immediate proximity in front of the longitudinal beads where they have tapered off in the end portions.

Preferably, the side impact beam according to the present invention is preferably cold formed from super strength sheet metal with a tensile strength of 1000 N/mm$^2$ or higher.

In practical tests, the dimensional measurements of the cross bead of about 4 mm in depth and 6 mm in width have been proven advantageous. The length of a cross bead extends over approximately ⅔ of the width of an end portion.

For practical purposes, the cross beads are oriented perpendicular to at least one, respectively more than one longitudinal beads. In principle, it is however also possible that the cross beads extend in an oblique manner, that is at an angle relative to the longitudinal axis of the side impact beam or respectively to the longitudinal bead.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
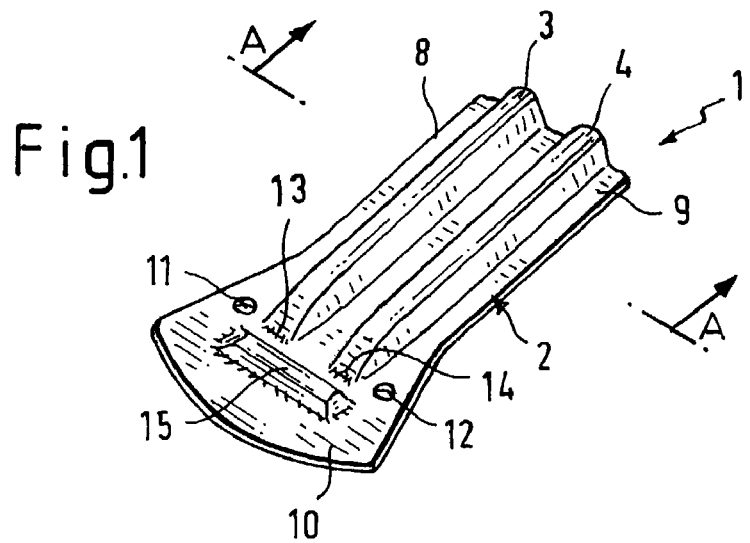
FIG. 1 is a perspective representation of an end portion of a side impact beam according to the present invention.

Throughout all the Figures, same or corresponding elements are generally indicated by same reference numerals.

Figure 3:
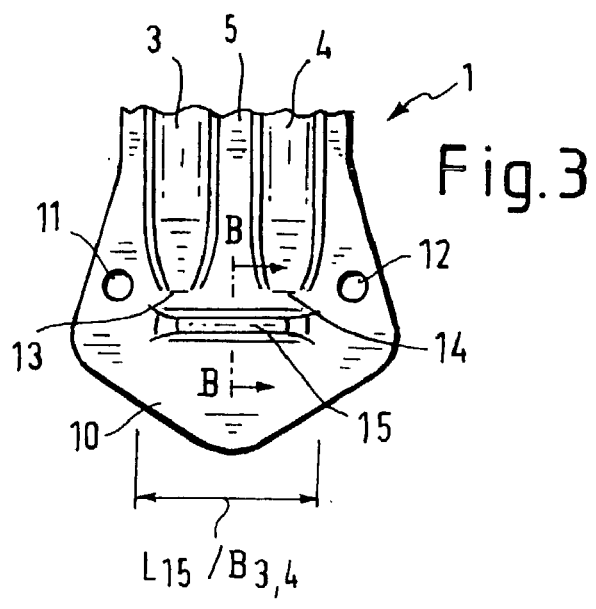
FIG. 3 is an end portion of the side impact beam in a top view.

Turning now to the drawing, and in particular to FIGS. 1 and 3, there is shown the area of an end portion of a side impact beam generally indicated by reference numeral 1, for incorporation into a car door of a motor vehicle (not shown here). The side impact beam 1 comprises a cold-formed profiled sheet metal 2 having a thickness between 1.0 mm and 3.0 mm. The side impact beam 1 is configured for stiffening the vehicle door and to absorb energy under a homogeneous deformation, when the door is subjected to side impact.

Figure 2:
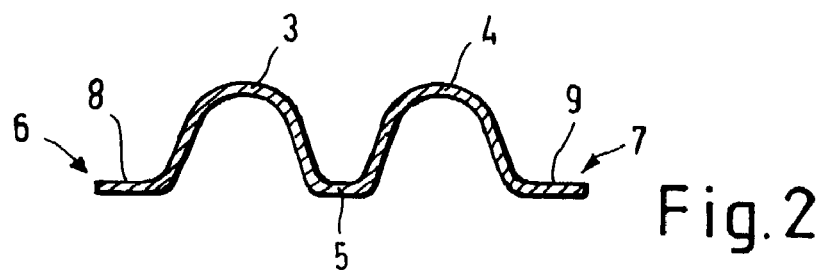
FIG. 2 is a cross section through the side impact beam according to FIG. 1 along line A—A.

The side impact beam 1 is configured with two longitudinal beads 3, 4 along the predominant length of the beam and extending approximately parallel to each other. As can be seen particularly in FIG. 2, the longitudinal beads 3, 4 as shown in cross section along line A—A exhibit an arched configuration in the shape of a half-round pipe or a hat and are connected by means of a common web 5. Both outer sidewalls 6, 7 of the metal profile 2 are provided with longitudinal webs 8, 9 extending transverse to the longitudinal beads.

The metal profile 2 is configured at each of its ends with a flaring end portion 10. With these end portions, the side impact beam is secured within the vehicle structure. FIG. 1 and also FIG. 3 each show two openings 11, 12 which are provided for accommodating means for securing the side impact beam within the vehicle structure. Normally, the side impact beams 1 are welded via the end portions into the doorframe of the car body.

Figure 4:
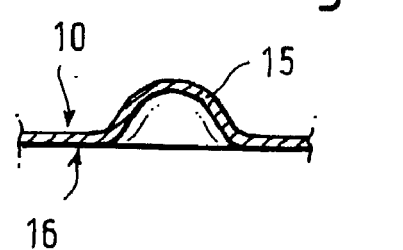
FIG. 4 is a section of the side impact beam of FIG. 3 along line B—B.
Figure 5:
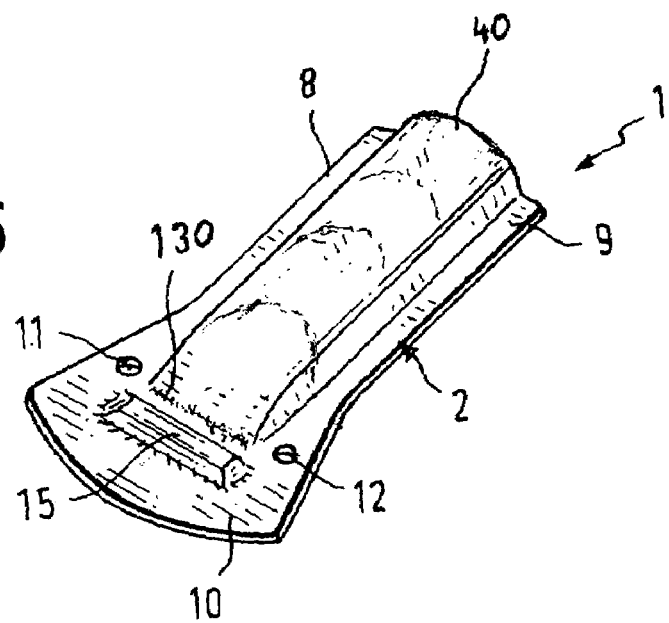
FIG. 5 is a perspective representation of an end portion of a further embodiment of the side impact beam.

The height of the longitudinal beads 3, 4, respectively bead 40 (FIG. 5) decreases towards the end portions 10 and are tapering off at their plane. A cross bead 15 is provided in front of the ends 13, 14 of the longitudinal beads 3, 4, respectively in front of end 130 of longitudinal bead 40. FIG. 4 shows a cross section of the cross bead.

The cross bead 15 and the longitudinal beads 3, 4 are stamped in such a manner that they are oriented in the same direction, wherein the length $L_{15}$ of the cross bead 15 is corresponding roughly to about the width $B_{3,4}$ of both longitudinal beads 3, 4.

During production of the side impact beam, the cross bead 15 is introduced by means of an additional tooling step during a downstream reshaping process. During the stamping process of the cross bead 15, the connection surface 16 of the end portions 10 are flattened or respectively straightened and calibrated. Deformations, possibly occurring from the upstream reshaping process are then straightened. Additionally, the end portions 10 are stiffened, thereby improving the performance of the side impact beam when subjected to a crash.

Due to the unvarying high quality and reproducibility that can be realized even during mass assembly of the end portions 10 as well as the side impact beam 1, incorporation of the side impact beam into the car structure can be improved and made more efficient.

While the invention has been illustrated and described as embodied in a side impact beam, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A side impact beam for incorporation into a motor vehicle comprising:
   an open sheet metal profile having flaring end portions integral with the beam;
   said sheet metal profile provided with a longitudinal bead defined by a first longitudinal bead spaced from a second longitudinal bead by a common web,
   a cross bead arranged at each end portion with the cross bead spaced from and in transverse disposition to said longitudinal bead;
   said longitudinal bead and said cross bead each have a length and a width dimension; and
   wherein the length of the cross bead is substantially equal to the width of the longitudinal bead and less than the width of the end portion.

2. The side impact beam of claim 1, wherein the first longitudinal bead, second longitudinal bead, and cross bead are so stamped in the metal profile as to be in a same plane.

3. The side impact beam of claim 1, wherein the cross bead is located in immediate proximity and in front of the longitudinal bead.

4. The side impact beam of claim 1, wherein the cross bead extends over approximately ⅔ of the width of the end portion.

* * * * *